Aug. 3, 1954   P. AMEELE ET AL   2,685,668
POWER PACK FOR FLASH HOLDERS
Filed Nov. 10, 1950   2 Sheets-Sheet 1
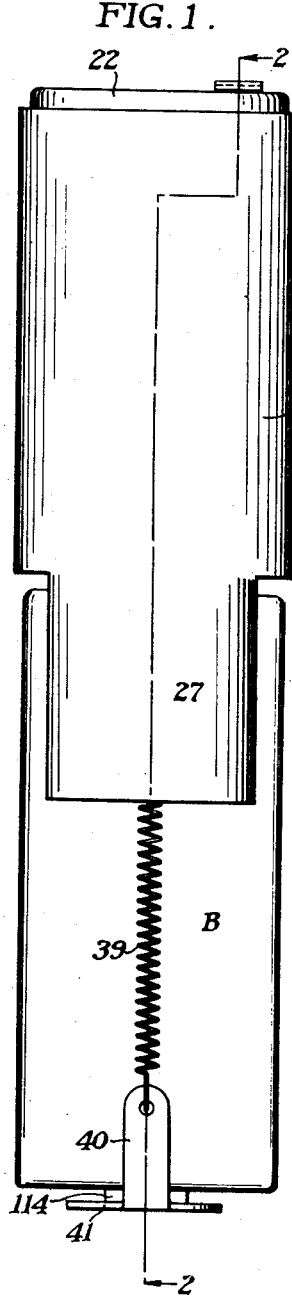
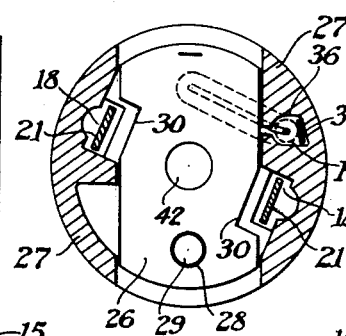
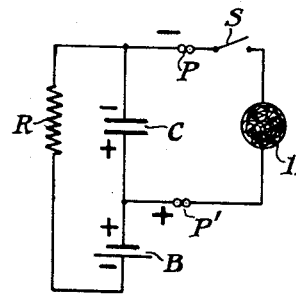
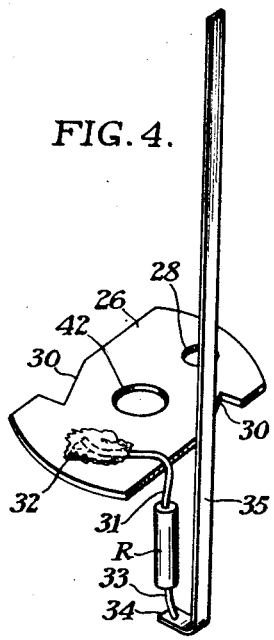
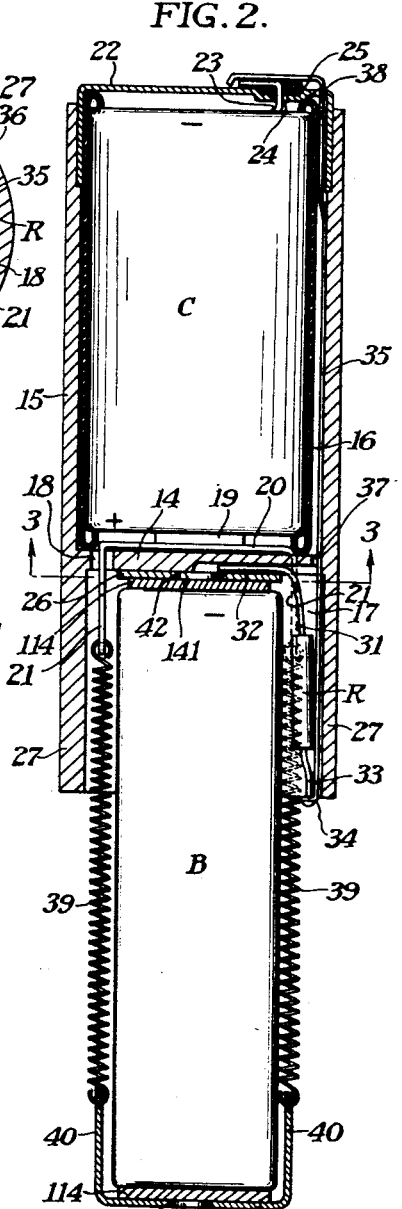
Peter Ameele
Harold L. Malone
Inventors
Attorneys Aug. 3, 1954 P. AMEELE ET AL 2,685,668
POWER PACK FOR FLASH HOLDERS
Filed Nov. 10, 1950 2 Sheets-Sheet 2

Peter Ameele
Harold L. Malone
Inventors

Daniel J. Mayne
By
Attorneys

Patented Aug. 3, 1954

2,685,668

UNITED STATES PATENT OFFICE 2,685,668

POWER PACK FOR FLASH HOLDERS

Peter Ameele and Harold L. Malone, Rochester, N. Y., assignors to Eastman Kodak Company, Rochester, N. Y., a corporation of New Jersey Application November 10, 1950, Serial No. 194,976

7 Claims. (Cl. 320—1)

The present invention relates to power supplies for flashlight photography, and particularly to a power pack including a battery and condenser in circuit which can be interchangeably used in conventional flash holders instead of two or more ordinary flashlight batteries, as is the usual procedure.

Conventional flash holders generally comprise a battery case of a size and shape to contain two or three ordinary flashlight batteries in end-to-end relation as a power supply. These holders also include a socket to accommodate a flash lamp and a lead wire for connecting a flash switch into the lamp circuit for controlling the same. As is well known, this flash switch may be built into the camera shutter, or may be housed in a synchronizer unit adapted to be connected to the camera in association with the shutter release so that the switch is closed and the shutter released in proper timed relation. When these flash holder batteries are of such size as to accommodate two "D" size batteries, or three "C" size batteries, the power supply consists of three, or four and one-half, volts, respectively.

It is often desirable to light a scene to be photographed with more than one flash bulb. With the conventional three, or four and one-half, volts supplied, this is not practical, and, to accomplish this end, a plurality of power supplies, or separate battery cases, are required to be hooked together, one for each extra lamp to be used. This procedure is not acceptable to most photographers because of the expense of equipment involved, and also because of the bulk and difficulty of handling the equipment on a photographic assignment.

The answer to this power supply problem is the battery-capacitor power supply, hereinafter referred to as a B-C system, wherein a small battery is used to charge a condenser which is then discharged across the flash lamp upon closure of the flash switch. Such a system gives more than enough power to fire four flash lamps connected in series, or parallel through the use of 100 feet of #18 twin-lamp cord. Furthermore, in such a system, the battery is never called upon to directly supply the current to flash the lamps, but only to charge the condenser, and the batteries will generally last their shelf-life, regardless of the number of lamps flashed. U. S. Pat. No. 2,395,600, Weisglass, February 26, 1946, suggests the broad idea of this B-C system for firing conventional flash lamps; his system, however, using ordinary condensers and ordinary flashlight dry cells. An article by Fritz and Marsal on pages 747–752 of the PSA Journal, vol. 13, No. 11, November 1947, suggests a B-C system using an electrolytic condenser and a "B" type, or hearing aid, battery of 22½ volts. This last system has the advantage that because of the higher voltage battery available, a smaller condenser can be used to give the necessary power in a short time. While this B-C system has been known for some time, and has recently become available to the trade in the form of a commercial item, flash units using this system have either been incorporated in elaborate and costly special flash holders, or have been built as an integral unit requiring replacement of the condenser as well as the battery when only a new battery was needed.

The primary object of the present invention is to provide a B-C power pack for conventional flash holders, which can be placed in the ordinary battery case in place of the two or three dry cells normally used, and which will require no change in the wiring or the manner of using the conventional flash holder.

Another object is to provide a power pack of the type mentioned which is so constructed that it can be handled as a separate unit which can be readily placed in, or removed from, the battery case of conventional flash holders.

And, another object is to provide a power pack of the type described which is so constructed that the battery thereof can be readily changed for a new one without requiring a change in the remainder of the pack, or its components.

And yet, another object is to provide a power pack of the type set forth which is not only compact enough to be handled, and used in a conventional flash holder, in the manner of conventional dry cells, but is so simple in construction and assembly as to be comparable in cost to dry cells when performance and duration of useful life of the pack is taken into consideration.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings, in which Fig. 1 is a side elevational view, on an enlarged scale, of a complete power pack constructed in accordance with a preferred embodiment of the present invention;

Fig. 2 is a vertical sectional view of the power pack taken substantially on line 2—2 of Fig. 1, but with the battery shown in elevation;

Fig. 3 is a horizontal section taken substantially on line 3—3 of Fig. 2;

Fig. 4 is a perspective detail showing the manner of assembling parts of the power pack forming a part of the complete power pack circuit;

Fig. 5 is a circuit diagram of the power pack and showing how the power pack circuit is connected into the flash lamp circuit when the power pack is placed in the battery case of a conventional flash holder;

Like reference characters refer to corresponding parts throughout the drawings.

Briefly, the present invention relates to a power pack for use in conventional flash holders which includes a small size, relatively high-voltage battery, and a condenser connected in circuit so that the condenser can be charged by the battery and then be discharged across the flash lamp to fire the same. The components making up the power pack are assembled in such a manner that the pack can be handled as a unit and be placed in conventional flash holders in place of two or more "D" or "C" cells for which the flash holder was originally designed. Furthermore, the components of the power pack are so arranged and assembled that the battery thereof may be readily removed and replaced when required; thus avoiding the necessity of buying a complete new power pack when the battery thereof fails for any reason.

Figure 6:
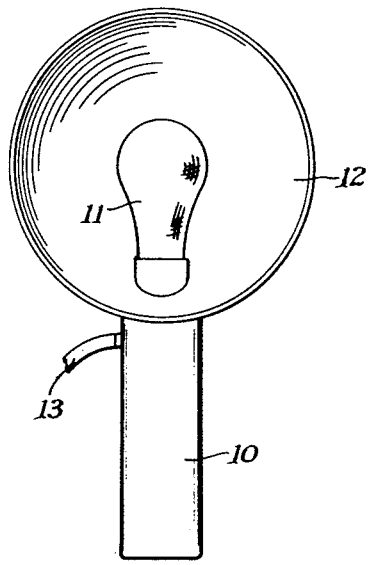
Fig. 6 is a front elevational view of a conventional type of flash holder in which this power pack is adapted to be used instead of conventional "D" or "C" dry cells.

Conventional flash holders are all generally of the type shown in Fig. 6, and comprise a battery case 10, which may be connected to a camera by any suitable form of bracket, not shown, and which case can be used as a handle for carrying the flash holder and/or camera if it is attached thereto. The battery case normally has one end thereof removable to permit the insertion of two or more "D" or "C" type dry cells in series relation, and which, when placed in the case, are connected in circuit with a flash lamp socket carrying a flash lamp 11 usually backed by a reflector 12. The battery and lamp circuit is adapted to be controlled by a flash switch which may be built into a shutter, or which may be a part of a separate flash synchronizer unit associated with the camera shutter in other known ways. For connecting this flash switch into the lamp circuit to control the same, the flash holder is generally provided with a twin connector cord 13 which is adapted to be plugged into such a switch.

The demand for being able to fire a plurality of flash lamps simultaneously in certain photographic assignments, along with the disadvantage of the short life of conventional flashlight dry cells, has made it desirable to provide a power supply for flash holders having greater current output capacity, plus longer life. Such a problem is solved by a battery-condenser power supply, hereinafter referred to as a B-C system or supply, for simplicity, wherein a condenser is charged by a small voltage battery and then discharged across the flash lamp to fire the same. By using a 22½ volt battery, and a condenser having a 200 mfd. capacity, it has been found that instantaneous current outputs of 10 amperes through a one-half ohm resistance can be obtained by discharging the condenser, and which output is more than sufficient to fire four flash lamps at one time connected in circuit by some 100 feet of extension cord. Furthermore, a B-C power supply of this nature has a useful life equal to the shelf-life of the battery, which is at least a year with available batteries, regardless of the amount of use they are given.

The wiring diagram of a power pack having a B-C circuit, in accordance with the present invention, is shown in Fig. 5 in association with the flash lamp circuit which it supplies power to. The circuit of the power pack alone includes a battery B, a condenser C, and a current-limiting resistance R connected in a loop circuit relation. Opposite ends of this power pack circuit constitute the external contacts of the power pack which connect, as indicated at points P and P', with the terminals of the flash holder circuit, including flash lamp 11 and synchronizer switch S, when the power pack is slipped into the flash holder in place of a pair of conventional dry cells, as is usually the practice. Current, from the battery B, continually charges the condenser C until its rated charge is built up therein, then the current drain on the battery effectively stops and the power pack is ready to supply the flash circuit. When synchranizer switch S is closed, condenser C discharges across the flash lamp and fires it. As pointed out above, as many as four flash lamps may be connected into the flash lamp circuit through 100 feet of electric cord and the condenser discharge will provide more than enough current to fire it. While different combinations of batteries and condensers may be used in this circuit, depending upon the power required and the charging time for the condenser which is acceptable, we have found that a particularly good combination includes a 22½ volt battery, a 200 mfd. condenser, and a 2700 ohm resistance. This combination gives a 10 ampere output through a one-half ohm resistance for one millisecond, has a charging rate of some 10 seconds for the condenser after complete discharge, and batteries and condensers of this rating are available on the market in small enough sizes to make a power pack which is compact enough to be used in flash holders in the place of conventional dry cells. One effect of interposing the resistance R is to regulate the charging rate of the condenser, and the resistance also prevents substantial discharge of the battery when the shutter switch is closed. Providing the conductor in that branch of the circuit in which the resistance R is placed possesses sufficient inherent resistance, then the separate resistance R can be omitted.

Figure 7:
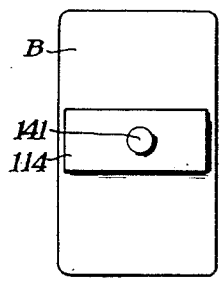
Fig. 7 is a top plan view of a conventional small "B" type hearing aid battery which this power pack is adapted to use.

While from the standpoint of operation there is no limitation on the type of battery or condenser which can be used in this power pack, there is a limitation introduced by the demand for small physical size in these components while still maintaining the desired ratings. In this connection, we have found that the 15 U. "B" type, or hearing aid, battery available on the market is a satisfactory battery for this power pack, since its longest outside transverse dimension is slightly less than the outside diameter of a conventional "C" size dry cell and will therefore slip into a conventional flash holder designed to accept these cells. Also, we have found that an electrolytic condenser having a 200 mfd. capacity is available on the market having a small enough physical size to work in our power pack unit. It will be appreciated that a characteristic of electrolytic condensers is that the current must be put through them in one direction in order for them to operate and, hence, the proper polarity of the connection of the condenser in the circuit must be observed. The polarities of the power pack circuit using an electrolytic condenser are indicated in the diagram of Fig. 5. It goes without saying that the rating of the battery, condenser and resistance used in this circuit can be altered in accordance with the output desired and the charging time which can be tolerated. A "B" battery of the type mentioned will tolerate a constant drain of 10 microamperes without shortening its life. Electrolytic condensers of 200 mfd. capacity are available which has as little as 10 microampere leakage until built up and after which the leakage drops to one microampere, or less. Consequently, a battery and electrolytic condenser can be hooked in a closed loop circuit, as we have shown them, without in any way affecting the life of the battery or its output capacity. In addition to such a closed loop circuit in the power pack causing the automatic recharging of the condenser after a lamp is flashed, thus eliminating the necessity of operating a separate charging switch to this end, it is a known fact that the efficiency and life of an electrolytic condenser is enhanced if there is a constant voltage applied thereto, rather than letting it remain idle for long periods. A "B" battery of the type mentioned is generally rectangular in cross section, as shown in Fig. 7, and has terminals at opposite ends in the form of straps 114 which include a depressed portion 141 extending beyond the ends of the battery and disposed centrally thereof, as best shown in Figs. 1, 2, and 7.

Referring now to Figs. 1-4, we will describe a power pack constructed in accordance with a preferred embodiment of the present invention, and having a B-C supply circuit of the type described. The power pack comprises a generally cylindrical sleeve 15 made of insulating material and having an outside diameter which is less than the inside diameter of the battery case of a conventional flash holder so that it can be slipped thereinto in place of the dry cells normally used. This sleeve is divided into an upper condenser compartment 16 and a lower battery compartment 17 by a transverse partition 14 of insulating material having two apertures 18, 18, substantially diametrically disposed with respect to the sleeve.

A paper-covered condenser C is slipped into the open end of the condenser compartment and has the terminal 19 at its lower end in contact with the cross arm 20 of a U-shaped metal strap resting on the upper face of said partition, and having its arms 21, 21 extending downwardly through the apertures 18, 18 in the partition and into the battery compartment. The terminal 19 of the condenser C is preferably physically connected to the cross arm 20, as by solder, so that a downward pull on the arms 21, 21 of the strap will serve both to hold the condenser and strap in fixed relation in the sleeve, as will be fully described hereinafter. The upper end of the sleeve is closed by a metal cap 22 which telescopes between the inside wall of the sleeve and the outside paper wall of the condenser. A lead 23 on the upper end of the condenser C, which forms the other terminal thereof, extends through a hole 24 in the metal cap 22 and is soldered in a turned-over relation with a recess 25 in the top of the cap. This metal cap 22, or the solder connection at 25, constitutes one external contact of the power pack circuit when slipped into the battery case of the flash holder.

On the lower side of the partition 14 there is located a metal contact plate 26 of the form best shown in Figs. 3 and 4. The battery compartment 17 is particularly formed to accept a battery B of the type shown in Fig. 7 and, hence, rather than being circular, has diametrically opposed portions of the walls of the sleeve cut away to allow the narrow walls of the battery to extend therethrough. As a result, the battery compartment in reality constitutes two diametrically opposed skirt portions 27, the outer faces of which are arcuate to engage the walls of the battery case of the flash holder, and the inner faces of which are straight, or have straight portions, to engage the wide faces of the battery and prevent the battery from turning relative to the sleeve and as a whole. As shown in Figs. 1 and 2, these skirt portions 27 do not extend the full length of the battery, but are only long enough to adequately position the battery in the unit with respect to the other circuit components. It will be obvious that the form and dimension of the battery compartment will be dictated by the shape and size of battery which is to be used in the power pack.

Coming back to the contact plate 26, it will be observed that straight sides thereof will engage the straight faces of the skirt portions 27 so that the plate will be held against rotation. In order to locate this contact plate against movement parallel to the straight faces of the skirt portions, the plate is provided with a hole 28 which engages a locating stud 29 extending from the lower face of the partition. The straight edges of the contact plate are also provided with notches 30 which come opposite the arms 21 of the U-shaped contact strap and thus insure these two parts being separated and electrically insulated from one another.

The resistor R is connected into the circuit in the manner indicated in Figs. 2 and 4. One lead 31 of the resistor is soldered at 32 to the upper face of contact plate 26, while the other lead 33 thereof is soldered to a turned-over end 34 on a contact strip 35. Resistor R and contact strip 35 are normally confined within a tubular recess 36 in one skirt portion 27 of the battery compartment, the contact strip extending upwardly through a third aperture 37 in partition 14, through the condenser compartment alongside the condenser, then through a second hole 38 in the metal cap 22, after which the end is turned over recess 24 and soldered to the cap and upper terminal of the condenser. This electrically connects the resistor across the battery and condenser, as shown in Fig. 5. It will be noted that the tubular recess 36, while open along one side to facilitate fabricating the sleeve by molding, will not allow the resistor to be removed laterally from said recess. Accordingly, the resistor and contact strip must be located in recess 36 by being slid upwardly thereinto from the bottom, and the whole assembly, as shown in Fig. 4 as including contact plate 26, resistor R, and contact strip 35, is slid upwardly into assembled relation from the lower end of the battery compartment. Inasmuch as the free end of the contact strip 35 is soldered to the metal cap after assembly in the sleeve, these parts are held in assembled relation in the unit. It is obvious that if the contact strip 35 is made from a metal having sufficient inherent electrical resistance, then resistance R can be eliminated and the contact strip can be directly connected to plate 26 or can be connected thereto by a separate electrical lead. In this connection, it should be remembered that the operation of the power pack does not depend upon the presence of the resistance R, but that such resistance is primarily inserted to prevent excessive drain on the battery during charging of the condenser and when the flash lamp circuit is closed.

Fixed to, and hanging from, each of the arms 21 of the U-shaped strap 20 is a coiled tension spring 39. The lower ends of these springs are connected to arms 40 of a U-shaped battery clip 41 on the cross arm of which the lower end of the battery B is adapted to be seated. In order to place the battery in the pack, the springs 39 are extended by pulling downwardly on the battery clip 41. Then, the lower end of the battery is seated on this clip and the upper end is slipped into engagement with the contact plate 26. When the springs are released, they draw the battery up tightly against the contact plate 26 and hold the same in fixed relation in the pack. The contact plate 26 and battery clip 41 are each provided with aperture 42 and 43 respectively, into which the depressed portion 141 on the battery terminals are to extend for holding the battery against lateral displacement relative to these two members. The springs 39, in addition to holding the battery in place, serve also to draw the upper U-shaped strap 20, and the condenser C fixed thereto, downwardly against the partition 14 and thus hold all of the parts of the unit tightly in place within the sleeve.

When the battery is in place, it is automatically connected into the power pack circuit and the lower battery clip 41 forms the second external terminal for the complete power pack circuit which engages one of the terminals in the flash holder battery case when the pack is placed therein, as indicated by one of the points P or P' in circuit diagram of Fig. 5. When the power pack is complete, it appears as shown in Fig. 1 and the overall dimensions thereof are substantially the same, or at least smaller than the overall dimensions of two "C" size dry cells placed in end-to-end relation, so that the pack can be used in a flash holder instead of a pair of such dry cells. One of the primary features of the present power pack is that the battery can be readily changed at any time, and, since this is the only part of the pack which is subject to fatigue or failure, the power pack can be revitalized at the cost of only a new battery, rather than at the cost of a complete new pack. In the event the condenser used is one of the electrolytic type, the polarity of the condenser in the circuit is important. To insure the battery being inserted into the circuit in proper polarity relation with the condenser, contact plate 26 is marked as to polarity, negative in the disclosed instance, and the battery, whose polarity is plainly marked on its sides, is placed in the unit so that the terminal thereof engaging contact plate 26 is the same polarity as said plate.

Figure 8:
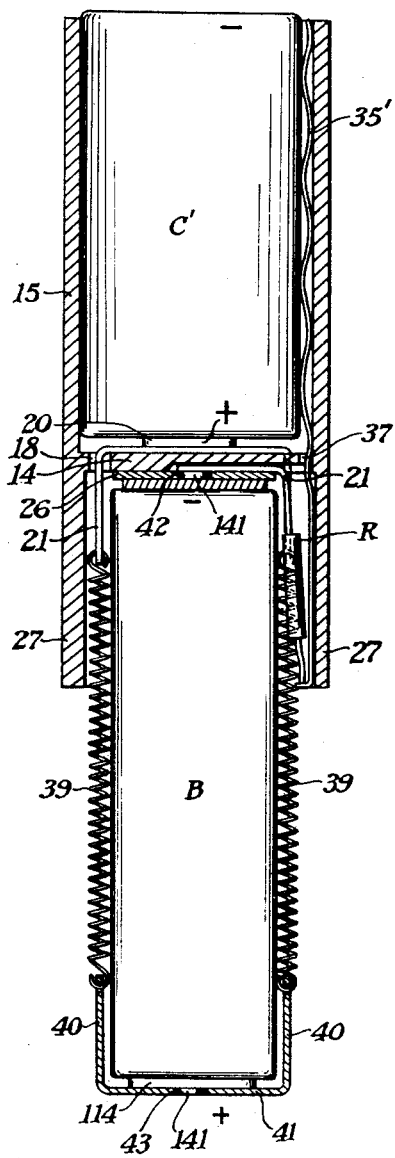
Fig. 8 is a vertical sectional view showing another embodiment of power pack which is possible in accordance with the present invention.

In Fig. 8, we have shown another embodiment of the present invention which has a lower assembly cost than the embodiment above described, although circuitwise and functionally the two are alike. Since the majority of parts of the two embodiments are the same, the same reference characters will be used to designate the corresponding parts of the two. The parts of the second embodiment which differ from those in the first embodiment will be referred to by the same reference characters primed (').

As before, this power pack comprises a sleeve 15 divided into a condenser compartment 16 and a battery compartment 17 by a transverse partition 14. The battery B has one terminal, the negative one as before, drawn into engagement with contact plate 26 by springs 39 connected at one end to U-shaped contact strap 20 and at the other end to U-shaped battery clip 41. These springs also act to pull contact strap 20 and the condenser soldered thereto downwardly against partition 14 as before.

The difference in this embodiment depends upon the use of a subscriber C' having no paper insulating sleeve, but having one terminal, the negative in this instance, being the metal can of the condenser. Then, if the metal can is one terminal of the condenser, the upper end of the condenser can be allowed to extend slightly beyond the end of the sleeve, as shown, and constitute one external terminal of the power pack. Now, if the upper end of the contact strap 35' from the resistor is made wavy in form to frictionally engage the wall of the condenser can, it will provide the necessary contact between the resistor R and the condenser C' and will also serve to frictionally hold the condenser in place when the battery is removed from the pack. Comparing this embodiment with that shown in Figs. 1 and 2, it will be seen that these minor changes eliminate the need for the metal contact cap 22 and the solder connections between the cap 22, the condenser terminal 23 and the free end of contact strip 35 leading from resistor R.

From the above description it will be seen that we have provided a power pack for use in conventional flash holders which, although having many times the power output of two dry cells normally used, is a unit compact enough to be used in these flash holders in place of dry cells for which they were originally designed. Furthermore, the power pack is so constructed that the battery thereof can be readily replaced when necessary, thus eliminating the need for purchasing of all new components when it is only a battery that is needed to revitalize the power pack. The pack is so designed that its component and assembly cost is a minimum, and, as the result of which, such a pack can be supplied at a cost comparable to that of dry cells when the relative lengths of service, power output, and efficiency of these two types of power supplies are taken into consideration.

Although we have shown and described certain specific embodiments of our invention, we are fully aware that many modifications thereof are possible. Our invention, therefore, is not to be limited to the precise details of construction shown and described, but is intended to cover all modifications coming within the scope of the appended claims.

Having thus described our invention, what we claim is new and desire to secure by Letters Patent of the United States is:

1. A power pack adapted for use in flash holders having a cylindrical battery case normally intended to receive two or more conventional flashlight batteries connected in series to supply power to a flash lamp circuit, and comprising a cylindrical sleeve of insulating material having an outside diameter smaller than the inside diameter of said battery case so as to slip thereinto; a partition of insulating material dividing said sleeve transversely into an open-ended condenser compartment and an open-ended battery compartment; an electrical condenser disposed in said condenser compartment with its first terminal electrically accessible through the open end of the condenser compartment to constitute one external terminal for connecting the power pack into the flash lamp circuit; a contact plate located on the side of the partition forming the bottom of said battery compartment; an electrical connection between the second terminal of said condenser and said contact plate; a battery having its terminals at opposite ends and having an outside dimension no greater than that of said battery case; and means for releasably positioning said battery in said battery compartment and electrically connecting it in series with the second terminal of said condenser and said contact plate, said last-mentioned means including a substantially U-shaped contact strip adapted to physically support one end of the battery and electrically engage the terminal thereon and extend beyond the open end of said battery compartment to provide the second terminal for connecting said power pack into the lamp circuit, and resilient means physically connecting said U-shaped contact strip to an immovable part of said sleeve and electrically connecting it to the second terminal of said condenser whereby said contact strip will normally urge the other terminal of a battery supported thereby into engagement with said contact plate and can be forced in the other direction to permit an exchange of batteries.

2. A power pack adapted for use in flash holders having a cylindrical battery case normally adapted to receive two or more conventional flashlight batteries in end-to-end relation to supply power to an external flash lamp circuit, and comprising a cylindrical sleeve of insulating material having an outside diameter smaller than the inside diameter of said battery case so as to slip thereinto, a partition of insulating material dividing said sleeve transversely into an open-ended condenser compartment and an open-ended battery compartment, said partition provided with a pair of substantially diametrically disposed apertures adjacent the inside wall of said sleeve, a U-shaped electrical conductor strap disposed with its cross arm engaging the top side of said partition and each of its vertical arms extending downwardly through opposite ones of said apertures in the partition and into the battery compartment; an electrolytic condenser disposed in the condenser chamber with its first terminal electrically connected to said U-shaped conductor strap; a contact plate disposed against the lower side of said partition; an electrical resistor disposed within said sleeve and having one end physically and electrically connected to said contact plate and the other end physically and electrically connected to the second terminal of said condenser; a second U-shaped conductor strap, a pair of tension springs physically and electrically connecting the vertical arms of said first and second conductor straps together; and a "B" type battery, having terminals at opposite ends and having an outside diameter not greater than that of said sleeve, seated on said second U-shaped contact strap with the terminal thereof in contact with the strap corresponding in polarity with the terminal of said condenser connected to said first strap contact and having its other terminal forced into engagement with said contact plate by the tension in said springs.

3. A power pack adapted for use in flash holders having a cylindrical battery case normally adapted to receive two or more conventional flashlight batteries in end-to-end relation to supply power to an external flash lamp circuit, and comprising a cylindrical sleeve of insulating material having an outside diameter smaller than the inside diameter of said battery case so as to slip thereinto, a partition of insulating material dividing said sleeve transversely into an open-ended condenser compartment and an open-ended battery compartment, a condenser disposed in said condenser compartment with one plate thereof accessible from the open end of the compartment to serve as a first terminal for the external flash circuit when placed in said battery case, and means for removably positioning a battery in said battery compartment and connecting it in circuit with the condenser, said last-mentioned means including conducting arms electrically connected to the second terminal of the condenser and extending into said battery compartment, a pair of tension springs connected at one end to opposite ones of said arms, a U-shaped conducting strap having its arms connected to the other end of said springs, said strap adapted to embrace and seat one end of the battery and to draw the battery up into said battery compartment by virtue of said springs and to constitute the other terminal for the external flash circuit when the pack is placed in said battery case.

4. A power pack adapted for use in flash holders having a cylindrical battery case normally adapted to receive two or more conventional flashlight batteries in end-to-end relation to supply power to an external flash lamp circuit, and comprising a cylindrical sleeve of insulating material having an outside diameter smaller than the inside diameter of said battery case so as to slip thereinto, a partition dividing said sleeve transversely into an open-ended condenser compartment and an open-ended battery compartment; said partition provided with a pair of spaced apertures placing said compartments in communication; a condenser disposed in said condenser compartment with one terminal thereof accessible from the open end of said compartment to constitute one external terminal of the power pack circuit, a double-ended contact strap rigidly connected intermediate its ends with the end of said condenser adjacent the partition and having each of its ends extending through a different one of said apertures in said partition and into said battery compartment; means for removably positioning a battery having a terminal at each end in said battery compartment, said last-mentioned means including a pair of tension springs, each connected at one end to opposite ones of the ends of said double-ended contact strap extending into said battery compartment, a second double-ended contact strap adapted to physically embrace the lower end of said battery and electrically connect with the lower terminal thereof to constitute the second external terminal of the power pack circuit, opposite ends of said contact strap connected to opposite ones of said tension springs so that the battery when seated on said second strap will have its other end drawn up against the partition in said sleeve and at the same time the tension on said springs will draw the condenser down into its compartment against said partition, and means in said sleeve for electrically connecting the innermost terminal of said battery to the condenser to complete the power pack circuit.

5. A power pack adapted for use in flash holders having a cylindrical battery case normally intended to receive two or more conventional flashlight batteries in end-to-end relation to supply power to a flash lamp circuit, and comprising a cylindrical sleeve insulating material having an outside diameter smaller than the inside diameter of said battery case so as to slip thereinto; a partition of insulating material dividing said sleeve transversely into a condenser compartment and a battery compartment; and provided with a pair of spaced apertures placing said compartments in communication, a condenser having a diameter slightly smaller than the inside diameter of said condenser compartment, and a length slightly greater than the length of said compartment disposed in said compartment, said condenser having a metal can casing which constitutes the first terminal of the condenser and one external terminal of the power path circuit; a U-shaped contact strap supported on the upper side of said partition and having its ends extending through opposite ones of the apertures in said partitions, the second terminal of said condenser physically and electrically connected to said contact strap, means for releasably holding a battery in said battery compartment and electrically connecting it in circuit with said condenser and including a metal battery supporting clip adapted to engage one terminal of the battery and constitute the second external contact of the power pack circuit, tension springs connected between the ends of the arms on said U-shaped contact strip and said battery supporting clip forming a part of the power circuit and serving to draw the second terminal of the battery upward toward said partition and the condenser downward toward said partition; a contact plate between the underside of said partition and the upper terminal of said battery, an electrical resistor having one end soldered to said contact plate and the other end connected to the first terminal of said condenser, said last connection including a contact strap extending into the battery compartment between the inner wall of said sleeve and the metal cover of said condenser and having a wavy form adapted to frictionally retain the condenser in its compartment and form a good electrical connection with the first terminal of said condenser.

6. A power pack adapted for use in flash holders having a cylindrical battery case normally intended to receive two or more conventional flashlight batteries connected in series to supply power to a flash lamp circuit, and comprising a cylindrical sleeve of insulating material having an outside diameter smaller than the inside diameter of said battery case so as to slip thereinto; a partition of insulating material dividing said sleeve transversely into an open-ended condenser compartment and an open-ended battery compartment; an electrical condenser disposed in said condenser compartment with its first terminal electrically accessible through the open end of the condenser compartment to constitute one external terminal for connecting the power pack into the flash lamp circuit; a contact plate located on the side of the partition forming the bottom of said battery compartment; a resistor in said sleeve and electrically connected between said first terminal of said condenser and said contact plate; a battery having its terminals at opposite ends and having an outside dimension no greater than that of said battery case; and means for releasably positioning said battery in said battery compartment and electrically connecting it in series with the second terminal of said condenser and said contact plate, said last-mentioned means including a contact strap adapted to seat one end of the battery and engage the terminal thereon, tension springs fastened at one end to said strap and fixed at the other end to an immovable part of said pack and electrically connected to the second terminal of said condenser, said springs being of such length that when said battery is seated on said strap, they are placed under tension to draw the other terminal of the battery into engagement with said contact plate.

7. A power pack adapted for use in flash holders having a cylindrical battery case normally intended to receive two or more conventional flashlight batteries connected in series to supply power to a flash lamp circuit, and comprising a cylindrical sleeve of insulating material having an outside diameter smaller than the inside diameter of said battery case so as to slip thereinto; a partition of insulating material dividing said sleeve transversely into an open-ended condenser compartment and an open-ended battery compartment; an electrical condenser disposed in said condenser compartment with its first terminal electrically accessible through the open end of the condenser compartment to constitute one external terminal for connecting the power pack into the flash lamp circuit; a contact plate located on the side of the partition forming the bottom of said battery compartment; a resistor in said sleeve and electrically connected between said first terminal of said condenser and said contact plate; a battery having its terminals at opposite ends and having an outside dimension no greater than that of said battery case; and means for releasably positioning said battery in said battery compartment and electrically connecting it in series with the second terminal of said condenser and said contact plate, said last-mentioned means including a contact strap adapted to seat one end of the battery and engage the terminal thereon, and tension springs physically and electrically connected at one end to said contact strap and at the other end to the second terminal of said condenser, said springs being of such length that when said battery is seated on said strap they are placed under tension to draw the other terminal of the battery into engagement with said contact plate and at the same time draw the condenser down against said partition to hold it firmly in its compartment.

References Cited in the file of this patent

UNITED STATES PATENTS

| Number | Name | Date |
| --- | --- | --- |
| 2,395,600 | Weisglass | Feb. 26, 1946 |
| 2,590,069 | Robinson | Mar. 18, 1952 |